United States Patent
Reid, Jr. et al.

[15] 3,703,773
[45] Nov. 28, 1972

[54] GAS PHASE REACTOR

[72] Inventors: James Paul Reid, Jr.; David S. Deskins, both of Greensboro, N.C.

[73] Assignee: Burlington Industries, Inc., Greensboro, N.C.

[22] Filed: April 9, 1970

[21] Appl. No.: 26,904

[52] U.S. Cl. ................................................. 34/159
[51] Int. Cl. ........................................... F26b 13/06
[58] Field of Search .................. 34/36, 37, 155, 159

[56] References Cited

UNITED STATES PATENTS

| | | | |
|---|---|---|---|
| 3,510,960 | 5/1970 | Kubodera | 34/155 |
| 3,166,445 | 1/1965 | Enemark et al. | 34/36 X |
| 3,264,054 | 8/1966 | Reinhardt et al. | 8/116.4 |
| 3,310,363 | 3/1967 | Russell et al. | 8/116.4 |

FOREIGN PATENTS OR APPLICATIONS

| | | | |
|---|---|---|---|
| 980,980 | 1/1965 | Great Britain | 8/116.4 |

OTHER PUBLICATIONS

Gagliardi et al., Textile Research Journal, 36, 168–177 (1966).

Mehta et al., Journal of the Textile Institute, 58, 279–292 (1967).

Wilson et al., Textile Research Journal, 38, 401–415 (1968).

*Primary Examiner*—John J. Camby
*Attorney*—Cushman, Darby & Cushman

[57] ABSTRACT

A method and apparatus are disclosed for the continuous treatment of fabrics containing cellulose with a gaseous mixture of formaldehyde and a catalytic amount of sulfur dioxide. The temperature and moisture content of the fabric to be treated are carefully controlled within a closed chamber as the fabric is first exposed to an atmosphere containing a non-explosive amount of formaldehyde vapor, then cured and dried within the closed chamber.

4 Claims, 2 Drawing Figures

INVENTORS
JAMES PAUL REID
DAVID S. DESKINS
BY Cushman, Darby & Cushman
ATTORNEYS

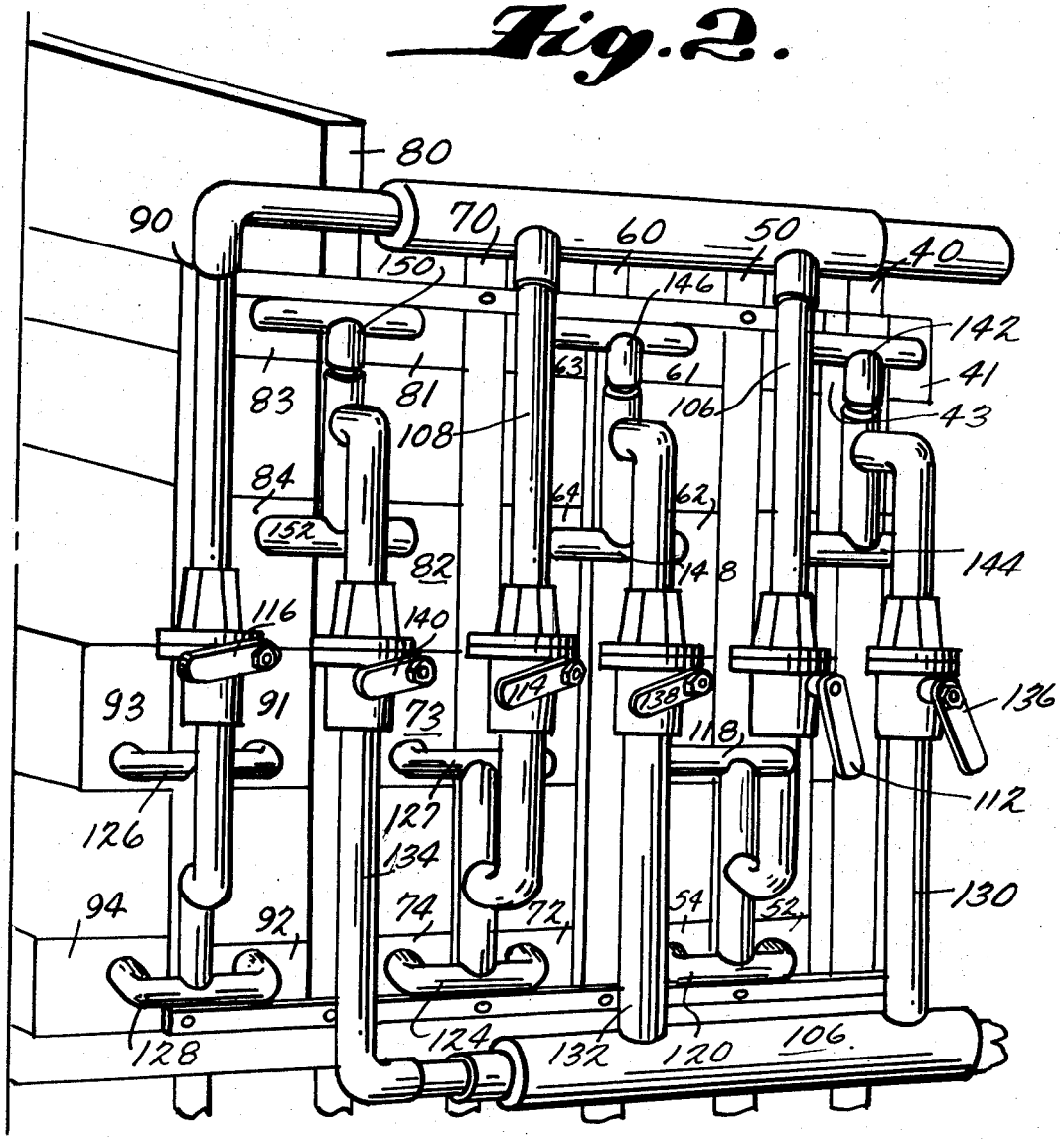

GAS PHASE REACTOR

BACKGROUND OF THE INVENTION

This invention relates to a continuous method and apparatus for treating textile fabrics comprising cellulose with formaldehyde.

The treatment of cellulosic materials with formaldehyde has been known for well over 100 years. Formaldehyde, due to its cross-linking of cellulosic chains, results in a significant increase in wet and dry wrinkle resistance. Formaldehyde, as the treatment agent, is particularly desirable because of its low cost and availability. The use of formaldehyde in the gaseous form for treating cellulose-containing material was first described by J. D. Guthrie, *Am. Dyestuff Reptr.* 51, 31–36 (1962), and in subsequent U.S. Pat. Nos. 3,154,373, 3,264,054 and 3,265,463. The reaction of gaseous formaldehyde with cellulosic materials comprises two chemical reactions. The first is reacting formaldehyde with cellulose in the wet state to give acetal cross-links and hemiacetal groups. The second is the cross-linking reaction of these hemiacetal groups by the addition of a catalyst and curing. During the first reaction the wet crease recovery and the dimensional stability of the fabric are enhanced. During the second step, there is a substantial increase in both wet and dry wrinkle recovery.

The catalyst used to promote the reaction is usually a strong acid or capable of producing a strong acid under reaction conditions. Acids suitable for this purpose include hydrochloric acid, sulfur dioxide, sulfur trioxide, hydrogen fluoride, organic acids such as formic acid, and acid anhydrides. As recognized in British specification No. 1,018,960, if the acid used is in the gaseous form and is caused to act on the formaldehyde-coated material until the cross-linking reaction is completed, an uncontrolled large amount of acid will be taken up by the fabric thereby damaging the cellulose material contained therein.

In order for the cross-linking reaction to proceed properly, the moisture content of the cellulosic textile material must be maintained within an operative range. When the fibers contain a lesser amount of moisture, the rate and extent of the cross-linking reaction is decreased, and when the fibers become completely dry, little or no reactions takes place. This problem becomes acute when the treating and curing phases are combined in a unitary heated compartment adapted for rapid, continuous operation.

Use of formaldehyde in its gaseous form in the treatment of cellulosic textile materials is through to result in a more uniform distribution of cross links as compared to the pad-bake-cure methods, as discussed by Wilson et al, *Textile Research Journal*, 38:401–415 (April 1968) at page 415. While vapor phase reaction with formaldehyde is currently attractive, it remains very dangerous primarily due to the combustion potential of formaldehyde vapor when mixed in air. The combustion range of formaldehyde is air is from about 7 percent to about 80 percent.

OBJECTS OF THE INVENTION

Accordingly, it is an object of this invention to control the amount of cross-linking within the cellulosic textile material by supplying the necessary amount of gaseous formaldehyde in the presence of an effective amount of gaseous sulfur dioxide catalyst while maintaining the required amount of moisture within the cellulosic fabric.

Another object of the invention is to control the adsorption/reaction time of the gaseous formaldehyde-sulfur dioxide by decreasing the rate of evaporation of the water content of the cellulosive textile while in a heated atmosphere.

Another object is to provide a continuous method of treating cellulosic materials by the use of formaldehyde vapor to enhance the wet and dry crease recovery of the cellulose without altering the other physical properties such as tensile strength, elongation, hand and appearance.

Another object is to substantially decrease or eliminate the combustion danger of formaldehyde vapor by maintaining the concentration thereof at less than about 7% while conducting the process within a relatively rapid amount of time.

Another object of the invention is to provide an apparatus for supplying the necessary amount of gaseous formaldehyde and sulfur dioxide catalyst to the cellulosic material to be treated in a heated chamber while maintaining an effective amount of moisture in the cellulosic material.

Another object of the invention is to provide an apparatus that decreases the rate of evaporation of the moisture from the cellulosive material to be treated while maintained in a heated chamber.

Another object is to provide a reaction chamber constructed so as to substantially decrease or eliminate the combustion danger of formaldehyde vapor mixed with air wherein the concentration of formaldehyde in air remains less than about 7 percent.

Another object is to provide a reaction chamber for the continuous, rapid treating of cellulosic textile material by contacting the material with a carefully controlled stream of formaldehyde-sulfur dioxide vapor while maintaining an effective amount of moisture within the material thus treated.

Still further objects and the entire scope of applicability of the present invention will become apparent from the detailed description given hereinafter; it should be understood, however, that the detailed description, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The invention is illustrated by the attached drawings, wherein:

FIG. 2 is an enlarged side view of the reaction area contained within the heated chamber.

Figure 1:
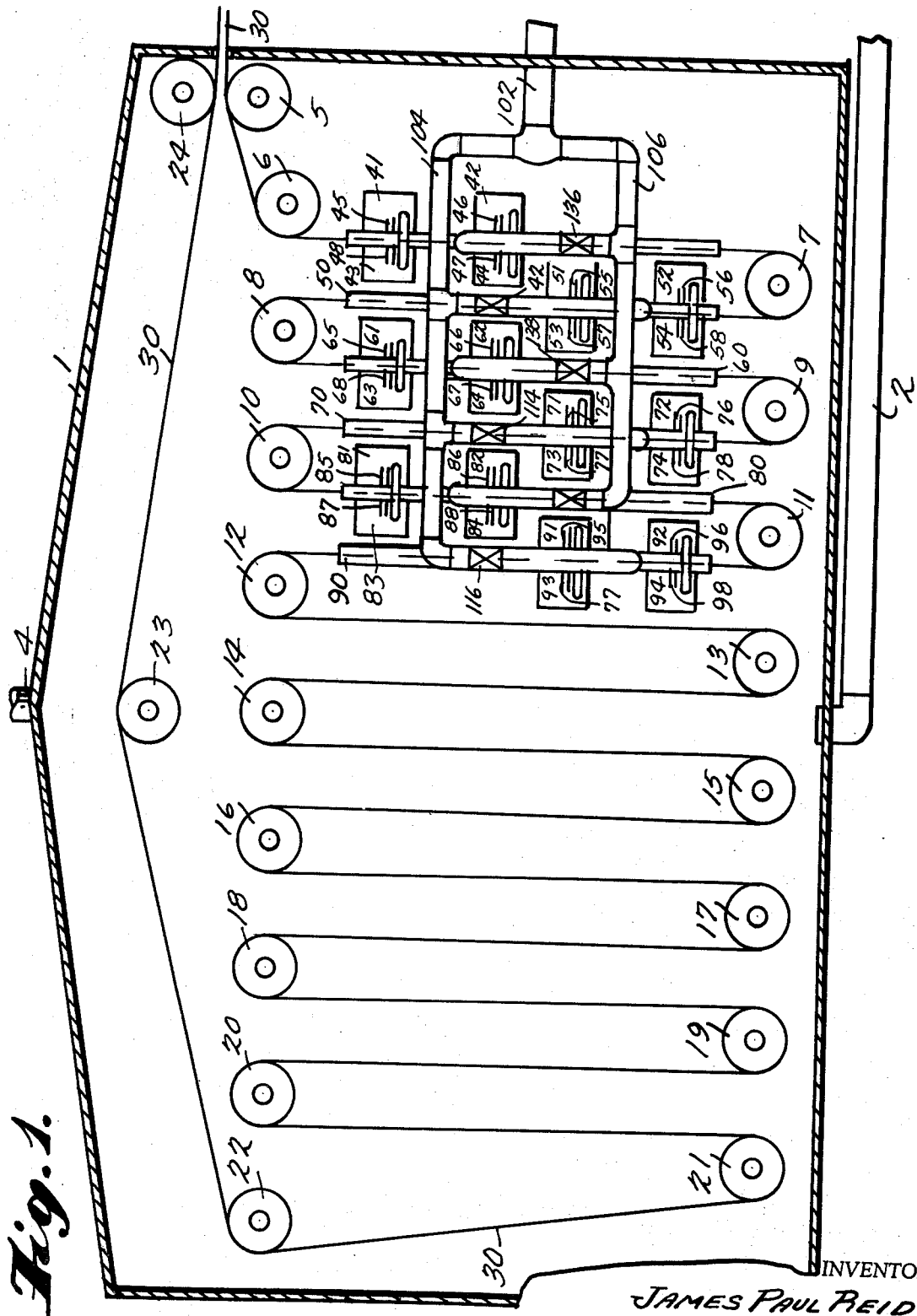
FIG. 1 is a plane cross-sectional view of the heated chamber with one side of the chamber wall removed.

Referring more specifically to the drawings, the apparatus consists of a large heated chamber 1 fitted with an inlet 2 for heated air and an exhaust 2' for removing the heated air and formaldehyde fumes from inside of the chamber 1. Disposed within the heated chamber is a series of rolls, those rolls in the reaction area being cooled rolls 5–11, and the remaining rolls 12–24 maintained at ambient temperature with respect to the closed interior of the heated chamber 1. The rolls 12-24 provide a continuous path for the fabric 30 through the reaction and curing area of the heated chamber 1.

The reaction as hereinafter described occurs in the area between cooled rolls 6-11, and is the region in which the formaldehyde/sulfur dioxide vapors contact the fabric 30 as it winds its way through the heated chamber 1. The fabric 30 to be treated is directed through a series of rectangular reaction chambers 40, 50, 60, 70, 80 and 90 after it enters the heated chamber 1. Each reaction chamber is of a larger width than the fabric 30 passing therethrough, and is fitted with four gas accumulators 41-44, 51-54, 61-64, 71-74, 81-84, 91-94 respectively two on each side of each reaction chamber. Considering the first reaction chamber 40, gas accumulators 41 and 42 are positioned on one side of the chamber, and gas accumulators 43 and 44 are positioned opposite and in alignment with gas accumulators 41 and 42. Each gas accumulator, for example, accumulator 41, is nearly square in cross sectional shape, extending the full width of its respective reaction chamber 40, and has a narrow diffusion slot 45 positioned in the center thereof opening into the reaction chamber 40. The diffusion slot 45 is opposite gas accumulator 43 and its corresponding diffusion slot 48.

The size of the opening of the diffusion slots is dependent upon the physical and chemical nature of the fabric to be treated, the speed of the fabric through the reaction chambers, and the concentration of the gaseous formaldehyde-sulfur dioxide mixture used. The accumulators are supplied with the gaseous mixture where the mixture collects and diffuses out of the accumulator 41 through the diffusion slot 45 into the reaction chamber 40. Reaction chambers 50, 60, 70, 80 and 90 are similarly supplied with diffusion slots 55-58, 65-68, 75-78, 85-88, and 95-98, respectively.

Gas accumulators 41-44 are placed at the top half of reaction chamber 40, while gas accumulators 51-54 are placed at the bottom half of reaction chamber 50. This staggered arrangement provides for a shorter horizontal distance between the two successive vertical paths, thereby increasing the total fabric length contained within the heated chamber 1.

A series of pipes and valves supplies formaldehyde - sulfur dioxide vapor from a suitable vapor generator (not shown) to the accumulators. Main supply pipe 102 is bifurcated into two manifolds 104 and 106. One manifold 104 supplies reaction chambers 50, 70, and 90 and their respective accumulators 51-54, 71-74, and 91-94 through pipes 106, 108, 110, gate valves 112, 114, 116, and tee pipes 118, 120, 122, 124, 126, and 128. Similarly, manifold 106 supplies reaction chambers 40, 60, 80 through pipes 130, 132, 134, gate valves 136, 138, 140, and tee pipes 142, 144, 146, 148, 150, and 152. As pictures in FIG. 2, gate valves 112 and 136 are open; gate valves 114, 116, 138, and 140 are closed.

Subsequent to the reaction area, the fabric is passed through a curing and drying area within the reaction chamber. The travel of the fabric 30 proceeds over rolls 12-24 which are maintained at ambient temperature with respect to the temperature of the heated chamber 1. Roll 23 directs the fabric up to roll 23 and is then guided out of the heated chamber 1 by roll 24.

The length of travel, time, speed of travel, and temperature of the curing and drying area is adjusted to conform to the nature of the fabric to be treated.

In operation the fabric 30 to be treated enters the heated chamber 1 and is directed by cooled rolls 5 and 6 into the first reaction chamber 40 where it passes downwardly between gas accumulators 41-44 and the corresponding diffusion slots 45-48. Cooled roll 7 directs the fabric 30 upwardly through the second reaction chamber 50, where it passes gas accumulators 51-54 and the corresponding diffusion slots 55-58. In a similar manner, fabric 30 passes serially through the remaining reaction chambers 60, 70, 80 and 90. After the fabric emerges from the last reaction chamber 90 in the series, it is directed by rolls 12-21 through a series of successive loops. It is in this area where the treated fabric 30 is heated causing the curing reaction, as hereinafter described, and the drying of the fabric 30. Rolls 722-24 guide the treated fabric 30 up over the moving apparatus and out of the heated chamber 1.

In the method hereinafter disclosed, descriptive but non-limiting examples of the fabric comprising cellulose that can be employed are: cotton, linen, hemp, jute, ramie, sisal, rayons, e.g., regenerated cellulose (both viscose and cuprammonium), cellulose acetate, cellulose acetate-propionate, cellulose acetate-butyrate and ethyl cellulose and mixture of such cellulosic fabrics with each other or other fabrics, e.g., nylon, acrylonitrile fibers or polyester (Dacron) fabrics. The invention is particularly applicable to the treatment of cotton fabric material such as cotton cloth. Other suitable materials will be readily apparent to one skilled in the art.

The moisture content of the cellulosic fiber to be treated is adjusted to between 2 percent and 30 percent, calculated on the fabric weight. The amount of moisture present in the fabric affects the rate and extent of the reaction in the gaseous formaldehyde treatment. An optimum moisture content depends, of course, on the fabric weight and fiber blend, and is generally between 8 percent 20 percent. It is desirable to control the moisture content of any given fabric within about plus or minus 2 percent during the treatment phase of the process. The moisture content of the cellulosic material must be adjusted prior to entry thereof into the machine, then carefully directed through the reacting area between cooled rolls 5-11 to maintain this moisture content. Thus as the fabric 30 is directed through the reaction chambers 40, 50, 60, 70, 80 and 90, it is disposed between two cooled rolls for example 6 and 7, located at either end of the reaction chamber 40. The cooled rolls 5-11 are maintained at a temperature below that of the heated chamber. Many expedients are available to cool the rolls, such as forced air at room temperatures or refrigeration means (not shown). However, the preferred method is to employ hollow rolls and circulate a liquid, such as water, therein at a temperature substantially lower than that of the heated chamber.

The cooled rolls 5-11 provide a means for reducing the evaporation rate of the moisture from the fabric by cooling the fabric between passes through the reaction chambers. The reaction chambers also serve to reduce the rate of moisture evaporation by confining a portion of the moisture evaporated from the fabric within the reaction chamber, thus producing a higher moisture equilibrium than the surrounding atmosphere of the heated chamber.

The acid selected to catalize the cross-linking reaction, according to our invention, is sulfur dioxide. In the selection of a catalyst, it is important to avoid hydrolysis of the cellulose contained in the textile to be treated but sufficiently effective to cause the cross-linking reaction to go in a relatively short period. In addition to the above desirable properties, sulfur dioxide forms a strong acid in the presence of aqueous formaldehyde, as represented by the following equation:

$$CH_2O + H_2O + SO_2 \rightleftharpoons HOCH_2SO_3H$$

The resulting acid is unstable and thus hydrolyzing the cellulose with excess acid and is more easily avoided. The amount of sulfur dioxide introduced into the reaction mixture can be varied over a wide range.

Air entering the heated reaction chamber is maintained at a range of from 75° to 200°F. The coating area generally operates at a temperature of 200° to 275°F, and the curing and drying portion of the heated chamber are usually maintained at about 200° to 275°F. These, of course, are the preferred operating temperatures and other temperatures may successfully be used, depending, for example, on the weight of the fabric.

The amount of time that the cellulose-containing fabric remains exposed to the reactive vapors is dependent upon the following factors: speed of the fabric as it passes through the entire apparatus, the weight and fiber blend of the fabric, the desired wrinkle resistant properties of the finished fabric, the concentration and flow rate of gaseous formaldehyde-sulfur dioxide mixture as it passes from the diffusion slots into the chutes in close proximity to the fabric, and the moisture content of the fabric to be treated. Although only six reaction chambers are shown in FIGS. 1 and 2, additional reaction chambers may be added as required, according to the present invention, so that the resulting adsorption/reaction time is from 4 to 120 seconds. With careful selection of the number of chutes and judicious setting of the gate valves 112, 114, 116, 136, 138, and 140, an optimum period of time required has been found to be of the order of 8 to 45 seconds.

The rate at which the formaldehyde vapor is supplied to the chutes is also dependent on fabric speed, weight, fiber blend, and desired physical properties of the resulting product. This rate is less than about 7 percent and an amount of the order of 0.25 to 5.0 percent of the fabric weight. It has been found that a supply rate of 0.5 to 2.0 percent is sufficient to give the finished product the desired fabric properties. At the preferred rate of 0.5 to 2.0 percent, the utilization of the formaldehyde vapor is in the proximity of 80 percent and frequently higher. A sufficient amount of sulfur dioxide, as discussed above, is present to catalyze the reaction and is supplied concurrently with the formaldehyde vapor.

As the treatment process proceeds, the amount of formaldehyde/sulfur dioxide mixture supplied to the fabric may be controlled to correspond to the amount of water present in the fabric.

The treatment is carried out at normal atmospheric pressure.

The pressure conditions for carrying out the process of the present invention thus include processing a cellulosic textile material or fabric under the following conditions:

i. the cellulosic fiber of textile material containing from 2 to 30 percent by weight of moisture, ii. in a closed heated atmosphere containing less than 7 percent gaseous formaldehyde in said atmosphere, and at a rate of 0.25 to 5.0 percent calculated on the fabric weight per unit of time at which the fabric or textile material enters the treating chamber, iii. the temperature of the enclosed heated chamber maintained between 200° and 250°F, iv. the material is exposed to formaldehyde vapors containing a catalytic amount of sulfur dioxide for a period of about 4 to 120 seconds.

v. the cellulosic material is directed by a plurality of cooled rolls thereby maintaining a sufficient amount of moisture in the fabric during the reaction/adsorption process, vi. at atmospheric pressure, vii. thereafter drying and curing the treated fabric or cellulosic textile material in said heated chamber for a period of about one-half to 3 minutes.

Following this treatment, the resulting product should be washed to remove residual sulfur dioxide, unused reactant and undesirable by-products of the cross-linking reaction. Prior to washing the resulting product, treatment of the coated fabric with a solution of a basic substance such as, for example, sodium carbonate, sodium hydroxide, sodium phosphate, neutralizes the residual acids and catalyst thereby facilitating washing.

We claim:

1. An apparatus for the continuous coating of fabrics comprising cellulose while maintaining a predetermined amount of moisture in said fabric during the coating treatment wherein said fabric is passed through an enclosed heating chamber and exposed to a controlled amount of reactant gas, said enclosed heated chamber including:

a. a series of reaction chambers, each of said reaction chambers having a plurality of gas accumulators mounted thereon and a narrow diffusion slot therein communicating with the interior of said reaction chamber for exposing a controlled amount of reactant gas to said fabric, i. said reactant gas directed to said gas ammumulators by a manifold supply means, ii. said reaction chambers in adjacent side-by-side arrangement;

b. means for guiding said fabric between said reaction chambers, said guiding means adjacent said reaction chambers and maintained at a temperature substantially below the temperature of said heated chamber thereby maintaining the moisture contact of the said fabric at the desired level;

c. means for guiding said fabric from said reaction chamber through the curing and drying portion of said heated chamber.

2. An apparatus as described in claim 1 wherein each of said reaction chambers has at least two gas accumulators mounted on opposite sides thereof in horizontal alignment with each other.

3. An apparatus as described in claim 1 wherein said heated chamber has warm air supply means and exhaust means.

4. An apparatus as described in claim 1 wherein said guide means are rollers.

* * * * *